Patented July 29, 1952

2,604,947

UNITED STATES PATENT OFFICE 2,604,947

PLUGGING AGENT AND PROCESS

Don Martin, Newark, Del., assignor to Hercules Powder Company, Wilmington, Del., a corporation of Delaware No Drawing. Application November 22, 1946, Serial No. 711,801

2 Claims. (Cl. 166—22)

This invention relates in general to a plugging agent and method and in particular to improvements in a method of secondary oil recovery.

In the production of oil from a particular oil well or oil producing area, there is a period during which subterranean pressure causes a substantial flow or gushing of oil from the oil well. However, as oil continues to be taken from the well or from the area, this pressure is dissipated until eventually the natural flow of oil ceases and it is necessary to resort to other methods to obtain oil from partially depleted areas.

One method of secondary recovery for obtaining oil from depleted areas contemplates utilizing a producing well substantially in the center of the area or of a selected portion of the area with two or more intake wells around the periphery of the area or the portion of the area. A fluid such as, for example, water, is pumped into the intake wells under pressure and flows out through the porous oil-bearing sand forcing the oil toward the producing well from which it may be pumped and thereby removed. A difficulty arises in this method of secondary recovery because the various strata of sand in the oil-producing area have different permeabilities so that the oil may be completely exhausted from one layer of more permeable sand, thereby forming a channel to carry the water from the intake well to the producing well while the oil-bearing sand in another layer retains substantial quantities of oil. Thus, when one relatively permeable stratum has been substantially exhausted, recovery by this method may soon become impractical, first, because such a large quantity of water flowing through the exhausted strata accompanies the flow of water into nonexhausted strata that the cost of pumping water into the intake wells may exceed the value of the yield obtained and, second, because the water may flow so readily through the exhausted permeable stratum that it is impossible to build up a sufficient pressure behind the nonexhausted strata to force appreciable quantities of oil therefrom.

To overcome this problem, there has been developed a method known as selective plugging which consists in employing a plugging agent which enters the more highly permeable strata, thereby decreasing their permeability so that the flow of water through the exhausted strata is decreased to permit a more efficient use of the water and water pressure in forcing oil from nonexhausted strata. A plugging agent and method must, to be effective, selectively plug the more permeable strata and must be relatively stable against unplugging through deterioration or through back pressure within the strata.

Now in accordance with this invention, secondary recovery from oil wells is improved by selective plugging of permeable strata by means of introducing into the strata a finely-dispersed emulsion of a substantially gasoline-insoluble natural resin.

In carrying out the present invention, a secondary recovery system which has developed an exhausted permeable stratum or in which the water flow has channeled is selectively plugged by introducing into the intake water a quantity of a protected emulsion whose dispersed phase comprises finely-divided particles of a substantially gasoline-insoluble pine wood resin. This is carried by the intake water selectively into the more permeable strata or channels wherein it reduces the permeability, thereby reducing the flow of water and permitting the maintenance of a higher water pressure. If it is desired to remove the plugging agent or to reduce its effect, a water-soluble alkali is added to the intake water and is carried into the partly plugged strata wherein it dissolves or partially dissolves the plugging agent, thereby completely or partially restoring the higher permeability.

The following examples are presented in illustration, not in limitation, of methods of carrying out this invention.

EXAMPLE I

An oil well designated as oil well No. 1 which had been partially exhausted and which had developed at least one substantially exhausted stratum in secondary recovery, as indicated by the consumption of 290 bbls. of water per day at a pressure of 260 lbs. per square inch was treated as follows: 58 gallons of a concentrated aqueous emulsion containing as the dispersed phase a substantially gasoline-insoluble natural resin, the emulsion being emulsified and protected by means of ammonium salts of resin acids and casein, was added to the intake water of the well; the intake water was continuously pumped to the well, thereby carrying the resin emulsion into the permeable strata. The permeability of the more highly permeable strata was reduced as indicated by a decrease in intake water consumption from 290 bbls. a day to 110 bbls. a day and a simultaneous increase in water pressure from 260 lbs. per square inch to 400 lbs. per square inch; the oil production at the same time remained substantially constant indicating that there was little if any plugging effect on the oil-producing, less permeable strata.

The substantially gasoline-insoluble natural resin used in this example had the following characteristics:

| | |
|---|---|
| Drop melting point °C | 115 |
| Acid number | 93 |
| Gasoline-insoluble matter per cent | 88 |
| Toluene-soluble matter do | 80 |
| Saponification number | 140 |
| Ash content per cent | 0.02 |

EXAMPLE II

An oil well designated as well No. 5 which had developed at least one substantially exhausted stratum, as indicated by consumption of 210 bbls. a day at a pressure of 275 lbs. per square inch was treated with 55 gallons of gasoline-insoluble natural resin emulsion as described in Example I, whereby the water consumption dropped to 25 bbls. per day at a pressure of 460 lbs. per square inch. After the well ran for several days at substantially the same rate, 25 lbs. of sodium hydroxide was added to the intake water whereby it was carried into the plugged strata. The water consumption consequently rose from 25 bbls. of water per day to 65 bbls. of water per day.

The table shows the effect on water pressure and water consumption by the plugging of a series of oil wells according to the procedures described in Examples I and II. Upon the addition of the resin emulsion to each of these wells, the water consumption was reduced with an accompanying increase in water pressure. In all instances, the oil production from the wells remained substantially constant or was increased.

Table

| Well No. | Bbls. Water/day, Pretreatment | Bbls. Water/day, Posttreatment | Av. Pressure Pretreatment, p. s. i. | Av. Pressure Posttreatment, p. s. i. |
|---|---|---|---|---|
| 1 | 290 | 110 | 260 | 400 |
| 2 | 520 | 150 | 290 | 420 |
| 3 | 410 | 40 | 440 | 425 |
| 5 | 280 | 70 | 425 | 440 |
| 6 | { 210 | 25 | 475 | 460 |
|   | 25 | 65 | | |

The pine wood resin which is useful in the compositions of this invention may be any portion or substantially all of that dark-colored fraction of pine wood resin which can be extracted from the wood with aromatic hydrocarbons and which is characterized by a petroleum hydrocarbon insolubility of from about 30% to about 95%.

The wood resin extract of pine wood such as is obtained by extracting pine wood with benzene consists of pale rosin, gasoline-insoluble resinous material and color bodies. Frequently such extract contains 15% or more of gasoline-insoluble resinous material. Upon the treatment of such resinous extract to separate therefrom a fraction of pale rosin there is formed one or more fractions containing the balance of the resinous material derived from the pine wood. One or more of such remaining fractions may be used as the resin material in this invention. The nonrosin portion of the pine wood extract may be separated by appropriate processes into a fraction of substantially gasoline-insoluble resinous material and a dark-colored intermediate fraction lying between the substantially gasoline-insoluble fraction and rosin. It is impossible to effect an absolutely clean separation between the gasoline-insoluble resinous material and the rosin. By the preparation of a dark-colored intermediate fraction containing some gasoline-insoluble resinous material and the color bodies, a very good separation of the pine wood extract into rosin, gasoline-insoluble resinous material, and into this intermediate fraction is effected.

As one of the pine wood resins of this invention, it is preferable to use the dark-colored intermediate fraction largely insoluble in petroleum hydrocarbons and obtained by the refining of impure wood rosin to pale grades by means of a selective solvent for color bodies such as furfural, or a selective adsorbent such as fuller's earth. Such an intermediate fraction contains at least 30% and up to about 80% by weight of a gasoline-insoluble resinous material. Still further, the other pine wood resin which may be utilized in this invention is the substantially completely gasoline-insoluble resinous material derived from pine wood and which contains at least about 80% by weight of gasoline-insoluble resinous material. Mixtures of the foregoing resinous materials may also be employed. As an example of such a mixture, a blend of the dark-colored intermediate fraction and the substantially gasoline-insoluble fraction, obtained, for example, from pine wood without separation into the individual fractions either by a process which involves leaving the rosin in the wood or by a process which involves separation of the rosin, may be used. The resin material preferably contains at least about 30% of gasoline-insoluble resinous material, varying therefrom up to about 95%.

The dark-colored fraction referred to above is a product resulting from the process used in decolorizing rosin. For example, so-called FF rosin, which is ruby red in color and is derived from pine wood by extraction with benzene followed by evaporation of the benzene and extraction of the resinous residue with a petroleum hydrocarbon such as hot petroleum ether or hot gasoline, is decolorized by adding furfural to the hot solution, agitating the mixture, and then allowing the mixture to form a liquid layer system in which the furfural layer contains the unsaponifiables and coloring bodies in the original FF rosin and the gasoline layer contains the pale rosin. The furfural layer is separated from the gasoline layer and distilled to recover the furfural, the residue remaining being the dark-colored intermediate fraction referred to. This fraction contains most of the coloring bodies and a larger proportion of the unsaponifiables from the original FF rosin as well as a good proportion of the rosin acids. It contains a large proportion of oxidized rosin acids and, therefore, is only partially soluble in petroleum hydrocarbon solvents at room temperature. The percentage of gasoline-insolubles varies from about 30% to about 80% by weight. It has a higher flow point, a much higher viscosity, lower acid number and a higher unsaponifiable content than FF wood rosin. However, the saponification number is not correspondingly lower, indicating, thereby, a higher ester content. In addition it is noncrystallizing. Such a fraction is characterized by the following approximate analysis:

| | |
|---|---|
| Acid number | 105–140 |
| Saponification number | 150–170 |
| Melting point | 176° F.–239° F. |
| (Hercules drop method) | (80° C.–115° C.) |
| Unsaponifiable matter | 10–20% |
| Gasoline insoluble | 30–80% |
| Petroleum ether insoluble | 30–80% |

A typical example of such a fraction had the following analysis: acid number, 124; saponification number, 150; melting point (drop), 89° C.; gasoline-insoluble, 57%; unsaponifiable matter, 12%; Lovibond color, dark; ash content, 0.03%.

The substantially gasoline-insoluble fraction referred to above may be prepared from pine wood by the processes set forth in U. S. patents to Hall, Nos. 2,193,026 and 2,221,540. This fraction is characterized by being substantially completely insoluble in petroleum hydrocarbons such as gasoline. The gasoline-soluble portion of this fraction rarely exceeds 20% by weight. This fraction may be said to be the gasoline-insoluble resin contained in pine wood. For example, the extraction of pine wood with benzene yields a mixture of this fraction and FF rosin. Upon treatment of the resinous mixture with a mixture of gasoline and a relatively small volume of furfural the substantially gasoline-insoluble fraction goes into solution in the furfural while the FF rosin goes into solution in the gasoline. The two layers are allowed to separate and the resinous materials then may be recovered from the separated layers in any suitable manner.

The substantially completely gasoline-insoluble fraction is, in general, defined by the following characteristics: Substantial insolubility in petroleum hydrocarbons, the insolubility being of the order of at least 80%, substantially complete solubility in alcohol, a methoxy content of from about 3% to about 7%, an acid number of from about 80 to about 110, a melting point by the Hercules drop method of from about 95° C. to about 125° C., a saponification number of from about 135 to about 145, and a noncarboxylic hydroxyl content of from about 5% to about 9%. A typical specimen had the following characteristics: Drop melting point, 115° C.; acid number, 93; gasoline-insoluble matter, 88%; toluene-soluble matter, 80%; saponification number, 140; ash content, 0.02%.

In general the pine wood resins employed in carrying out the present invention and which are typified by the dark-colored intermediate fraction of color bodies referred to at length above and the substantially completely gasoline-insoluble fraction and blends thereof may be defined as the resins naturally occurring in pine wood and characterized by a gasoline-insolubility of about 30% to about 95%, an unsaponifiable content of from about 5% to about 20%, a melting point above 85° C. and preferably about 90° C., and an acid number of not over about 140.

The gasoline-insoluble resin is dispersed in an aqueous medium using, for example, ammonium or alkali salts of resin acids, a protein dispersing agent or the like. Other emulsifying agents may be used, for example, a cellulose ether such as carboxymethyl-cellulose or its salts, triethanolamine, quaternary ammonium salts, polyamino fatty acid amides, alkylaryl sulfonates, esters and ethers of polyhydroxy compounds and long chain fatty acids and alcohols, and the like. Other stabilizing agents, likewise, may be used, such as various proteins, gums, and the like, the various agents being present either singly or in combination, as protective and emulsifying agents for the emulsion. For example, to an emulsion whose dispersed phase consists of at least about 30% gasoline-insoluble resin and which contains ammonium or alkali salts of resin acids and a protective colloid such as casein, there may be added about 0.1% to about 5% of sodium carboxymethylcellulose.

In treating an oil well with the plugging agent, according to this invention, it is attempted to obtain a water consumption relatively near to the optimum value of about 1 to 3 bbls. per foot of oil-bearing sand per day. At this rate of water consumption, there is a favorable water-oil ratio.

Where the intake water consumption runs too low because of having been plugged with gasoline-insoluble resin emulsion, it is preferred to reduce the plugging action as, for example, by adding an aqueous alkali to the intake water whereby a portion of the plugging agent is dissolved and removed from the strata.

The plug obtained according to this invention is extremely stable and retains its effect for at least several months and apparently retains its effect until another slightly less permeable stratum has become substantially exhausted to permit the relatively free passage of water therethrough. When this occurs and a second increase in water consumption is noted, the plugging procedure may then be repeated, thereby once again decreasing the flow of water to a favorable economic level.

The plugging effect, according to this invention, is characterized by high stability of the plug for considerable lengths of time both against deterioration of the plugging agent and against loosening or removal of the plug because of back pressure when the flow of intake water is accidentally reduced. In addition, the plugging effect is readily controlled, in the first instance by properly selecting the quantity of the plugging agent and, in the second instance by being readily removable through treatment of the plugged well with an aqueous alkali.

What I claim and desire to protect by Letters Patent is:

1. In the process of secondary oil recovery wherein water is forced into an input well to assist in the recovery of oil from porous oil sands adjacent thereto, the improvement comprising selectively plugging watered-out sands by adding to the input water of said input well an aqueous emulsion whose dispersed phase is predominantly a substantially gasoline-insoluble natural resin, said natural resin being obtained as a by-product in the recovery of rosin from pine wood and having the following characteristics: a gasoline-insolubility of from 30% to 95%, an unsaponifiable content of from 5% to 20%, a melting point above 85° C. and an acid number of not over 140, the emulsified resin forming a hard petroleum- and water-insoluble plug in said oil sand which is easily removable on treatment with alkali by forming a completely water-soluble soap with said resin.

2. In the process of secondary oil recovery wherein water is forced into an input well to assist in the recovery of oil from porous oil sands adjacent thereto, the improvement comprising selectively plugging watered out sands by adding to the input water of said input well an aqueous emulsion whose dispersed phase is predominantly a substantially gasoline-insoluble natural resin, said natural resin being obtained as a by-product in the recovery of rosin from pine wood and having the following characteristics: a gasoline insolubility of from 30% to 95%, an unsaponifiable content of from 5% to 20%, a melting point above 85° C. and an acid number not over 140, said emulsion containing from 0.1 part to 5 parts of a water-soluble cellulose ether for each part of the dispersed natural resin, the emulsified resin forming a hard petroleum- and water-insoluble plug in said oil sand which is easily removable on treatment with alkali by forming a completely water-soluble soap with said resin.

DON MARTIN.

REFERENCES CITED

The following references are of record in the file of this patent:

UNITED STATES PATENTS

| Number | Name | Date |
| --- | --- | --- |
| 2,176,266 | Malmberg | Oct. 17, 1939 |
| 2,236,987 | Bechtold | Apr. 1, 1941 |
| 2,264,037 | Haskell | Nov. 25, 1941 |
| 2,272,672 | Kennedy | Feb. 10, 1942 |
| 2,272,673 | Kennedy | Feb. 10, 1942 |
| 2,323,929 | Miller | July 13, 1943 |
| 2,348,484 | Lawton | May 9, 1944 |
| 2,402,588 | Andresen | June 25, 1946 |
| 2,434,605 | Wrightsman | Jan. 13, 1948 |

OTHER REFERENCES

Hercules Powder Co., publication on "Sodium Carboxymethylcellulose," June 1944.